US011682397B2

(12) United States Patent
Ni

(10) Patent No.: US 11,682,397 B2
(45) Date of Patent: Jun. 20, 2023

(54) TRANSFERRING AN AUTOMATED ASSISTANT ROUTINE BETWEEN CLIENT DEVICES DURING EXECUTION OF THE ROUTINE

(71) Applicant: Google LLC, Mountain View, CA (US)

(72) Inventor: Yuzhao Ni, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/484,184

(22) Filed: Sep. 24, 2021

(65) Prior Publication Data

US 2022/0013121 A1  Jan. 13, 2022

Related U.S. Application Data

(63) Continuation of application No. 16/349,889, filed as application No. PCT/US2018/028924 on Apr. 23, 2018, now Pat. No. 11,133,003.

(51) Int. Cl.
*H04L 51/21* (2022.01)
*H04L 51/222* (2022.01)
*H04L 51/224* (2022.01)
*G10L 15/00* (2013.01)
*G10L 15/16* (2006.01)
(Continued)

(52) U.S. Cl.
CPC .............. *G10L 15/22* (2013.01); *G06N 3/006* (2013.01); *G10L 15/08* (2013.01); *G10L 15/30* (2013.01); *H04L 51/02* (2013.01); *H04L 67/12* (2013.01); *G10L 2015/088* (2013.01); *G10L 2015/223* (2013.01)

(58) Field of Classification Search
USPC .......... 382/103, 115–123; 704/1–276; 718/1, 718/100; 725/37–61, 86–104
See application file for complete search history.

(56) References Cited

U.S. PATENT DOCUMENTS 10,194,189 B1 * 1/2019 Goetz .............. H04N 21/43079
11,133,003 B2   9/2021 Ni
(Continued)

FOREIGN PATENT DOCUMENTS

| CN | 107490971 | 12/2017 |
| JP | 2017215639 | 12/2017 |
| WO | 2016054230 | 4/2016 |

OTHER PUBLICATIONS

Intellectual Property India; Examination Report issued in Application No. 202027046146; 9 pages; dated Dec. 3, 2021.
(Continued)

*Primary Examiner* — Marcellus J Augustin
(74) *Attorney, Agent, or Firm* — Gray Ice Higdon

(57) ABSTRACT

Transferring (e.g., automatically) an automated assistant routine between client devices during execution of the automated assistant routine. The automated assistant routine can correspond to a set of actions to be performed by one or more agents and/or one or more devices. While content, corresponding to an action of the routine, is being rendered at a particular device, the user may walk away from the particular device and toward a separate device. The automated assistant routine can be automatically transferred in response, and the separate device can continue to rendering the content for the user.

19 Claims, 4 Drawing Sheets

(51) Int. Cl.
  *G10L 15/22*  (2006.01)
  *G06N 3/006* (2023.01)
  *G10L 15/08*  (2006.01)
  *G10L 15/30*  (2013.01)
  *H04L 51/02*  (2022.01)
  *H04L 67/12*  (2022.01)

(56) References Cited

U.S. PATENT DOCUMENTS

| | | | |
|---|---|---|---|
| 2014/0244266 A1* | 8/2014 | Brown | G06F 3/167 |
| | | | 715/764 |
| 2015/0058409 A1 | 2/2015 | Wang | |
| 2016/0042735 A1 | 2/2016 | Vibbert et al. | |
| 2017/0025124 A1 | 1/2017 | Mixter et al. | |
| 2018/0330589 A1 | 11/2018 | Horling | |
| 2018/0336905 A1* | 11/2018 | Kim | G10L 17/22 |
| 2020/0184156 A1 | 6/2020 | Badr et al. | |

OTHER PUBLICATIONS

Japanese Office Action; Notice of Reasons for Rejection issued in Application No. 2021-214388, 16 pages, dated Feb. 14, 2022.
Korean Intellectual Property Office; Notice of Allowance issued in Application No. KR 10-2020-7033521; 3 pages; dated Apr. 14, 2022.
European Patent Office; Communication pursuant to Article 94(3) issued in Application No. 18726871.9, 6 pages, dated Jun. 10, 2022.
Korean Intellectual Property Office; Office Action issued in Application No. KR 10-2020-7033521; 7 pages; dated Jan. 27, 2022.
International Search Report and Written Opinion of PCT Ser. No. PCT/US2018/028924 dated Feb. 12, 2019.
Japanese Patent Office; Decision of Rejection issued in app. No. 2020-557971, 6 pages, dated Sep. 12, 2022.
Korean Intellectual Property Office; Office Action issued in Application No. KR 10-2022-7024822; 11 pages; dated Mar. 30, 2023.

* cited by examiner

TRANSFERRING AN AUTOMATED ASSISTANT ROUTINE BETWEEN CLIENT DEVICES DURING EXECUTION OF THE ROUTINE

BACKGROUND

Humans may engage in human-to-computer dialogs with interactive software applications referred to herein as "automated assistants" (also referred to as "digital agents," "chatbots," "interactive personal assistants," "intelligent personal assistants," "conversational agents," etc.). For example, humans (which when they interact with automated assistants may be referred to as "users") may provide commands and/or requests using spoken natural language input (i.e. utterances) which may in some cases be converted into text and then processed, and/or by providing textual (e.g., typed) natural language input.

Some automated assistants can perform a routine of multiple actions in response to receiving a particular command. For example, in response to receiving a spoken utterance of "good night", an automated assistant can cause networked lights to be turned off, can cause tomorrow's weather forecast to be rendered to the user, and can cause the user's agenda for tomorrow to be rendered to the user. Unfortunately, a user may not be able to stop a routine once an automated assistant has already begun directing performance of one or more of the multiple actions involved in the routine. This can be problematic in situations when a user is attempting to halt the routine and/or cause the automated assistant to perform a separate action or separate routine while a current routine is being executed. As a result, a current routine being executed must typically continue until completion, and there will be a delay before the automated assistant can be responsive to a user request to perform another action or routine. Furthermore, any computing and/or network resources expended on continuing to perform the current routine would be wasted.

Also, in performing a routine, an automated assistant typically causes content related to the routine to be rendered (e.g., audibly and/or graphically) only at one or more particular client devices, such as the client device via which the routine was initiated and/or a client device that is explicitly manually designated in the routine. If a user moves away from the particular client device(s), the rendered content may no longer be readily perceptible by the user. This can cause the user to fail to ascertain the rendered content, resulting in a waste of computational and/or network resources in unnecessarily rendering imperceptible content. Yet further, for a user to subsequently ascertain the content that he/she failed to ascertain, the user must again cause the automated assistant to perform the entirety of the routine, resulting in further waste of computational and/or network resources in again rendering of all of the content of the routine, including those portions actually perceived by the user, in addition to those that weren't perceived.

SUMMARY

Implementations disclosed herein are directed to methods, apparatus, and computer-readable media (transitory and non-transitory) for transferring an automated assistant routine between client devices during execution of the routine by an automated assistant. An example routine can be a morning routine, in which an automated assistant performs multiple different actions sequentially in the morning in order to prepare a user for their day. For instance, a morning routine can involve the automated assistant causing a schedule of the user for a particular day (e.g., the current day) to be audibly rendered via a client device, the automated assistant causing an appliance (e.g., a coffee maker) to turn on, and then causing a podcast to be audibly rendered via the client device while the user is getting ready. When an automated assistant is causing content to be rendered to a user in furtherance of the routine, it may be the case that a user will walk away from an assistant client device that is rendering the content, and that at least partially hosts the automated assistant. As a result, the user may temporarily not see and/or hear the rendered content from the assistant client device. Furthermore, if the user walks around their home during performance of the morning routine, the user may be required to explicitly request that the morning routine be stopped and started each time they leave a room that includes the assistant client device that is rendering the content in furtherance of the routine. This can result in computational and/or network resources being wasted on processing of spoken utterances required to stop and/or restart a routine.

In order to provide for a fluid and/or automatic transition of routines between client devices, and to improve the efficiency of computer and/or network resource consumption, implementations set forth herein allow for automatic transitioning of automated assistant routines between assistant devices. In this way, routines, including complex routines, can be implemented in a technically improved manner. For example, a routine can be distributed between assistance devices in an adaptive way, enabling improved device behavior for a given circumstance. The manner in which each device operates can be adjusted according to the adaptive needs of a given instantiation of a routine. Since a routine may be implemented over a period of time, the optimal allocation of resource utilization between devices may vary as conditions change during that time period; the present disclosure can adapt device behavior in recognition of this factor. In some of those implementations, rendering of content for a routine can initially occur at only an initial subset (e.g., only one) of available client devices. For example, the rendering of content for a routine can initially occur at a single client device as a result of a spoken shortcut command phrase (described below) for the routine being detected at the single client device (or being detected most strongly at the single client device). As another example, the rendering of the content for the routine can initially occur at a single client device additionally or alternatively as a result of detection of presence of a user near the single client device. Detection of the user can be based on sensor data from one or more sensors (of the client device and/or other networked devices), and the detection can be determined to be near the single client device based on the sensor(s) being of the client device and/or of other networked devices that are spatially correlated (e.g., in a network topology) with the client device. As another example, the rendering of the content for the routine can initially occur at a single client device as a result of the single client device being manually designated as the single client device at which the routine should be initiated. For example, a morning routine can be automatically triggered at a certain time and/or upon detection of one or more triggering events. For instance, the morning routine can be triggered in response to one or more triggering events occurring during a certain timeframe. The triggering event(s) can include, for example, data from a smartphone indicating a wake alarm has been dismissed, data from a networked connected coffee maker indicating coffee is being brewed, and/or data from a smart camera indicating a user has been detected in a particular location. Continuing with the example, the morning routine can manually designate a particular client device via which content for the routine should be initially rendered.

Further, during rendering of content for the routine at the initial subset of client devices, the routine can be transferred to one or more additional available client devices that are not in the initial subset. In transferring the routine, the additional available client device(s) are caused to render content for the routine. The content rendered by the additional available client device(s) includes content for the routine that has yet to be rendered by the client device(s) of the initial subset, and can optionally include a "replay" of some of the content that was already render by the client device(s) (e.g., a replay of the last five seconds of audible content rendered by the client device(s) of the initial subset prior to the transfer). In transferring the routine, rendering of content for the routine at the client device(s) of the initial subset can optionally be halted. The halting of the rendering of the content at the client device(s) of the initial subset can occur prior to, or simultaneous with, the initializing of the rendering of content at the additional available client device(s). The halting of the rendering of the content at the client device(s) of the initial subset can also gradually occur following the rendering of content at the additional available client device(s) (e.g., the volume of audible content can be gradually lessened, then stopped following the initialization the rendering of content at the additional available client device(s)). In implementations where halting of the rendering of the content at the client device(s) of the initial subset occurs, network and/or computational resources can be conserved as a result of content not being transferred to, and/or rendered by, the client device(s) of the initial subset.

In various implementations, transferring of a routine to additional available client device(s) that are not in the initial subset can occur based on detecting presence of a user near the additional available client device(s). For example, content from the routine can be caused to be automatically rendered additional available client device(s) in response to detecting such presence. As another example, an audible and/or visual prompt to transfer the routine can be caused to be automatically rendered at the additional available client device(s), and content from the routine rendered in response to affirmative user interface input being received in response to the prompt. Detection of the user near the additional available client device(s) can be based on sensor data from one or more sensors (of the additional available client device(s) and/or other networked devices), and the detection can be determined to be near the additional available client device(s) based on the sensor(s) being of the additional available client device(s) and/or of other networked devices that are spatially correlated (e.g., in a network topology) with the additional available client device(s). In some of those various implementations, halting of rendering of content at the initial subset of client devices can occur in response to the detecting of the presence of the user near the additional available client device(s). Additionally or alternatively, halting of rendering of content at the initial subset of client devices can occur in response to detecting lack of presence of the user near the initial subset of client device(s), based on sensor data from sensor(s) correlated to the initial subset.

As mentioned above, in some implementations an automated assistant routine can be initialized in response to detecting a shortcut phrase or command in spoken or typed natural language input of a user. The shortcut command provides a condensed command for causing an automated assistant to perform a set of actions, optionally in a particular sequence. A condensed command is "condensed" in that it is shorter in length than the commands that would otherwise need to be spoken/typed, but for the condensed command, to cause the automated assistant to perform the set of actions. Providing of a condensed command to cause performance of a set of actions, in lieu of longer commands for the set of actions, can enable less user input to be provided (and transmitted and/or processed), thereby conserving computational and network resources. As one example of a condensed command for an automated assistant routine, when a user wakes up in the morning, the user can trigger a "good morning" routine by providing a spoken utterance to a kitchen assistant device (i.e., a client computing device located in the kitchen). The spoken utterance can be, for example, "good morning," which can be processed by the assistant device and/or a remote assistant device (in communication with the assistant device) for initializing the "good morning" routine. For example, the assistant device and/or the remote device can process audio data corresponding to the spoken utterance to convert the spoken utterance to text, and can further determine the text "good morning" is assigned, for the user, to a set of automated assistant actions to be performed in response to a spoken utterance of "good morning".

Although various automated assistant routines can be initialized in response to a spoken or typed shortcut command, in some implementations, an automated assistant routine can additionally or alternatively be initialized in response to a user pressing a virtual or hardware element at a client device or peripheral device, performing a gesture that is detected via sensor(s) of a client device, providing other tactile input(s) at the client device, and/or providing any other type of computer-readable user interface input. For example, a graphical user interface (GUI) can be presented at a client device with a selectable icon, where the selectable icon provides a suggestion for the user to initialize the automated assistant routine. When the user selects the selectable icon (e.g., a GUI button that says "Good Morning"), the automated assistant can initialize the corresponding automated assistant routine in response. Additionally, or alternatively, an automated assistant routine can be initialized automatically, for instance, in response to an automated assistant detecting presence of a user (e.g., detecting a particular user using voice authentication and/or facial recognition), an alarm going off (e.g., a wake alarm set on an associated phone or other device), opening of an application, and/or other user action that can be recognized by an automated assistant (e.g., based on signals from one or more client devices).

An example "good morning" routine can include the aforementioned actions of causing a schedule of the user to be rendered, causing a particular appliance to be turned on, and causing a podcast to be rendered. Again, by enabling the automated assistant to be responsive to such shortcut commands, the user does not necessarily need to provide a string of commands in order to cause the automated assistant to perform the corresponding actions (e.g., the user would not need to recite the spoken utterance: "Assistant, read me my schedule, turn on my appliance, and play my podcast."). Instead, the automated assistant can be responsive to a shortcut command, which the automated assistant can process in order to identify the actions corresponding to the shortcut command. In some implementations, a routine can be personalized, thereby enabling a particular shortcut command or other input that causes performance of a routine to cause a particular set of actions to be performed by the automated assistant for one user, whereas the same input would cause a different set of actions to be performed by the automated assistant for a different user. For example, a particular user may specifically configure the automated assistant to perform a first set of actions in response to a shortcut command, and a spouse of the particular user can configure the automated assistant to perform a second set of actions in response to the same shortcut command. The automated assistant can distinguish between users that provide the shortcut command using one or more sensor inputs and/or one or more determined characteristics such as voice signatures, facial recognition, image feeds, motion characteristics, and/or other data.

When a user provides a shortcut command, such as "good morning," to an assistant device, such as a kitchen assistant device, content corresponding to one or more actions of the routine can be initially rendered by the kitchen assistant device as a result of the spoken utterance being directed to the kitchen assistant device. For example, the content can initially be rendered exclusively at the kitchen assistant device (i.e., without simultaneously being rendered at any other client devices), despite other devices acknowledging the shortcut command. For example, multiple devices can acknowledge a shortcut command being received at their respective automated assistant interfaces, however, the device that receives the loudest and/or least distorted shortcut command can be designated as the device at which the automated assistant routine will be initialized. However, as the user proceeds to move about their home in order to prepare for their day, the routine can be shared across one or more other assistant devices within the home.

For example, as the user leaves the kitchen and enters an office of their home, the kitchen assistant device can detect that a user is moving out of the kitchen. The user can be detected moving out of the kitchen as the automated assistant is audibly rendering the schedule for the day. In response to the detection, the automated assistant can pause the audible rendering of the schedule until the user is again detected near the kitchen assistant device, or is detected near another assistant device. For instance, the user can move from the kitchen into an office, which can include an office assistant device. As a result of detection of the user near the office assistant device, the office assistant device can be caused to resume audibly rendering the schedule of the user for the day. Furthermore, the office assistant device can continue performing other, yet unperformed, actions of the "good morning" routine, so long as the user continues to be detected near the office assistant device.

In order to detect presence of a user, the user can specifically request that the automated assistant continue executing his/her routine as the user moves about their home. This can ensure that the automated assistant has explicit permission to detect presence of the user for purposes of transitioning a routine between devices. The detection of the user can be effectuated through a variety of modalities such as audio, video, and/or any other medium through which presence of a user can be perceived. In some implementations, an assistant device can employ an audio subsystem that includes one or more microphones in order to detect a voice signature of a user for verifying whether the user is proximate to the assistant device. Additionally, or alternatively, the automated assistant can detect motion and/or presence of a user based on whether a threshold amount of noise is detected near an assistant device. For example, if the user is in the kitchen at the beginning of the good morning routine, but walks into the office afterwards, thereby creating some amount of noise in the office, the noise in the office can be detected by an assistant device in the office. As a result, the automated assistant can determine that the amount of noise generated satisfies a threshold for transferring a routine, and therefore cause the routine to be transferred from the kitchen assistant device to the office assistant device.

In some implementations, the transfer of a routine can be based on learned behavior, thereby allowing the user to cause the transfer of routines between devices, without necessarily creating noise. For example, a user can cause the initialization of a routine in their kitchen and then, during execution of the routine, specifically request the automated assistant transfer the routine to their office using a spoken utterance. After one or more times of explicitly requesting this transfer, the automated assistant can learn to pre-emptively cause the transfer based on other sensor inputs, such as a motion sensor in the kitchen and/or a motion sensor in the office. For instance, initialization of the automated assistant routine at the kitchen device can be triggered in response to detection of a user in the kitchen via sensor output from a motion sensor for a light in the kitchen of the home of the user. Thereafter, the user can walk into their office, and detection of the user in the office detected via sensor output from another motion sensor for a separate light in their office. The automated assistant can learn this behavior, as the lights and motion sensors can communicate with the automated assistant over a home network, and therefore cause rendering of content of the routine to be performed by client devices that spatially correspond to the motion sensors.

In some implementations of transferring routines between devices, the automated assistant can operate according to one or more databases that store routine instances. A routine instance can be stored at one or more server devices and/or client devices that can at least partially host the automated assistant. For example, a remote server device can store routine instances, which can optionally be accessible to client devices that provide an automated assistant interface for the automated assistant. When a routine is initialized at a first client device, a routine instance can be generated or updated to indicate that the routine has been initialized at the first client device. For instance, a routine instance can be initialized through a command such as "modify mornin-g_routine.status.Active=1; modify morning_routine.device-.DeviceID=3." The "DeviceID" slot can indicate the location or device (e.g., a kitchen device) where the routine has been initialized, and the "Active" slot can indicate whether the routine is active or not. The values associated with the "morning_routine" function can be accessible to multiple different devices in the home of the user, as well as any other device that can be associated with an account of the user.

When a user causes a routine to be transferred between devices, the first client device (i.e., "DeviceID=3") can transmit a signal to the remote server device that manages the status of the "morning_routine" function, where the signal causes the status of the "morning_routine" function to be modified. For example, the signal from the first client device can cause a command at the remote server device to be executed such as, "modify morning_routine.action.Re-ad_Daily_Schedule.pause=1," causing a particular action of the routine (e.g., "Read_Daily_Schedule") to be paused. For instance, causing the particular action of the routine to be paused can cause the first client device to halt rendering of content corresponding to the routine. The first client device can be caused to halt rendering of content in response to, for example, a halt command transmitted to the first client device from the remote server, or the cessation, by the remote server, of streaming of the content to the first client device. When the user is subsequently detected near a second client device, such as an assistant device in the home office, the second client device can cause the remote server device to modify the location or device associated with the routine. For instance, in response to determining that the user has moved into their home office while the routine is still active, the command "modify morning_routine.DeviceID=2; modify morning_routine.action.Read_Daily_Schedule.pause=0" can be executed. The aforementioned command can cause the "DeviceID" slot value to change to "2" (i.e., the home office device identifier), and the "pause" slot value to change to "0," thereby causing the action of "Read_Daily_Schedule" to unpause at the second client device. The automated assistant can then proceed with causing the daily schedule of the user to be rendered at the second client device, and the first client device can return to a standby mode.

In some implementations, limitations can be placed on the transfer of routines between devices. For instance, a user that lives with a spouse may wish to not disturb the spouse, when the user has initialized their "good morning" routine. For example, the spouse can typically be meditating in a home gym while the "good morning" routine is being performed by the automated assistant. In order to ensure that the automated assistant does not disturb the spouse, the user can provide an explicit command such as, "Assistant, do not ever transfer the 'Good Morning' routine to the gym assistant device." In response, a slot value associated with the "good morning" routine can be modified by a command such as, "modify morning_routine.deny.DeviceID=1." The slot value "DeviceID=1" can refer to the gym assistant device, and "deny" can refer to a limitation that denies the automated assistant the ability to transfer the "good morning" routine to the gym assistant device.

In some implementations, a first user can cause a first routine to be executed at a kitchen assistant device and a second user can cause a second routine to be executed at an office assistant device, where both the kitchen assistant device and office assistant device are in the same home. When the first user leaves the kitchen, the first routine can be paused, however, should the user walk into the office, the office assistant device can limit the transferability of the first routine to the office assistant device. In this way, the first routine will not disturb the second routine, at least until the second routine is completed. When the second routine completes at the office assistant device while the first user remains in the office, the first routine can be resumed at the office assistant device. Otherwise, if the first user leaves the office during the second routine and returns to the kitchen, the first routine can be resumed at the kitchen assistant device.

In some implementations, in executing a routine an automated assistant interfaces with one or more local and/or remote agents. For example, for a routine that includes three actions, an automated assistant can interface with a first agent in performing the first action, a second agent in performing the second action, and a third agent in performing a third action. As used herein, an "agent" references one or more computing devices and/or software that are utilized by an automated assistant. In some situations, an agent can be separate from the automated assistant and/or may communicate with the automated assistant over one or more communication channels. In some of those situations, the automated assistant may transmit, from a first network node, data (e.g., an agent command) to a second network node that implements all or aspects of the functionality of the agent.

In some situations, an agent may be a third-party (3P) agent, in that it is managed by a party that is separate from a party that manages the automated assistant. In some other situations, an agent may be a first-party (1P) agent, in that it is managed by the same party that manages the automated assistant.

An agent is configured to receive (e.g., over a network and/or via an API) an invocation request and/or other agent commands from the automated assistant. In response to receiving an agent command, the agent generates responsive content based on the agent command, and transmits the responsive content for the provision of user interface output that is based on the responsive content. For example, the agent may transmit the responsive content to the automated assistant for provision of output, by the automated assistant, that is based on the responsive content. As another example, the agent can itself provide the output. For instance, the user can interact with the automated assistant via a client device (e.g., the automated assistant can be implemented on the client device and/or in network communication with the client device) and the agent can be an application installed on the client device or an application executable remote from the client device, but "streamable" on the client device. When the application is invoked, it can be executed by the client device and/or brought to the forefront by the client device (e.g., its content can take over a display of the client device).

In some situations, in response to invocation of a particular agent according to techniques disclosed herein, a human-to-automated assistant dialog may be at least temporarily transferred (actually or effectively) to the particular agent. For example, output that is based on responsive content of the particular agent may be provided to the user in furtherance of the dialog, and further user input received in response to the output. The further user input (or a conversion thereof) may be provided to the particular agent. The particular agent may utilize its own semantic engines and/or other components in generating further responsive content that can be used to generate further output for providing in furtherance of the dialog. This general process may continue until, for example, the particular agent provides responsive content that terminates the particular agent dialog (e.g., an answer or resolution instead of a prompt), additional user interface input of the user terminates the particular agent dialog (e.g., instead invokes a response from the automated assistant or another agent), etc.

In some situations the automated assistant may still serve as an intermediary when the dialog is effectively transferred to the particular agent. For example, in serving as an intermediary where natural language input of a user is voice input, the automated assistant may convert that voice input to text, provide the text (and optionally annotations of the text) to the particular agent, receive responsive content from the particular agent, and provide output that is based on the particular responsive content for presentation to the user. Also, for example, in serving as an intermediary, the automated assistant may analyze user input and/or responsive content of the particular agent to determine if dialog with the particular agent should be terminated, if the user should be transferred to an alternate agent, if global parameter values should be updated based on the particular agent dialog, etc. In some situations the dialog may be actually transferred to the particular agent (without the automated assistant serving as an intermediary once transferred), and optionally transferred back to the automated assistant upon occurrence of one or more conditions such as termination by the particular agent (e.g., in response to completion of an intent via the particular agent).

The above is provided as an overview of various implementations disclosed herein. Additional detail is provided herein regarding those various implementations, as well as additional implementations.

In some implementations, a method implemented by one or more processors is set forth as including operations such as determining that an automated assistant routine has been initialized. The automated assistant routine can correspond to a set of actions to be performed via one or more agents accessible to an automated assistant. The initialization of the automated assistant routine can be associated with an ecosystem of linked client devices. The method can further include, in response to determining that the automated assistant routine has been initialized, causing an initial subset of the linked client devices to render initial content generated in performance of one or more of the actions of the automated assistant routine. The method can also include, after or during rendering of the initial content by the initial subset of the linked client devices, determining, based on sensor data from at least one sensor, that a user is present near an additional client device of the linked client devices. The additional client device can be excluded from the initial subset and may not render the initial content. The method can further include, in response to determining that the user is present near the additional client device, causing the additional client device to render further content generated in performance of the automated assistant routine.

In some implementations, the method can further include determining that the user is not present near any of the linked client devices of the initial subset, and causing rendering of any content generated in performance of the automated assistant routine to be halted at the initial subset of the linked client devices in response to determining that the user is not present near any of the linked client devices of the initial subset.

In some implementations, determining that the user is not present near any of the linked client devices of the initial subset can occur prior to determining that the user is present near the additional client device. Furthermore, causing the rendering of any content generated in performance of the automated assistant routine to be halted at the initial subset of the linked client devices can occur prior to rendering, by the additional client device, of any content generated in performance of the automated assistant routine.

In some implementations, determining that the user is not present near any of the linked client devices of the initial subset can be based on additional sensor data, from at least one additional sensor. In some implementations, the additional sensor data, from the at least one additional sensor, can be utilized in determining that the user is not present near any of the linked client devices of the initial subset based on one or both of: the at least one additional sensor being integral with at least one of the linked client devices of the initial subset, and the at least one additional sensor being spatially correlated, in a device topology, with at least one of the linked client devices of the initial subset.

In some implementations, determining that the user is not present near any of the linked client devices can include determining that the user is present near the additional client device. In some implementations, the method can further include storing a status of the routine, wherein the status of the routine indicates a state of the routine when the rendering of any content generated in performance of the automated assistant routine was halted at the initial subset of the linked client devices. The method can further include determining the further content to be rendered at the additional client device based on the status of the routine.

In some implementations, the method can include determining, based on the stored status of the routine, a portion of the initial content rendered by the initial subset of the linked client devices. The method can also include in response to determining that the user is present near the additional client device, causing the additional client device to render the portion of the initial content prior to rendering the further content generated in performance of the automated assistant routine.

In some implementations, the initial subset of the linked client devices can be a single client device and the method can further include receiving data transmitted by the single client device in response to user interface input, of the user, detected by the single client device. Determining that the automated assistant routine has been initialized can be based on determining that the user interface input conforms to the automated assistant routine, and the single client device can be caused to render the initial subset of data based on the user interface input being transmitted by the single client device.

In some implementations, the user interface input comprises a spoken utterance that includes a shortcut phrase for the automated assistant routine, and the data comprises audio data. The method can also include performing speech-to-text processing of the audio data to generate text. Determining that the user interface input conforms to the automated assistant routine can include determining that the generated text includes the shortcut phrase, and determining that the shortcut phrase is stored in association with the automated assistant routine.

In some implementations, the sensor data, from the at least one sensor, can be utilized in determining that the user is present near the additional client device based on: the at least one sensor being integral with the additional client device, or the at least one sensor being spatially correlated, in a device topology, with the additional client device.

In some implementations, determining, based on the sensor data, that the user is present near the additional client device, can include determining that the user is within a threshold distance of the additional client device. In some implementations, determining, based on the sensor data, that the user is present near the additional client device, can include determining that the sensor data includes at least one characteristic that is indicative of presence of any user. In some implementations, the automated assistant routine can be stored in association with a user profile of the user, and wherein determining, based on the sensor data, that the user is present near the additional client device, can include determining that the sensor data includes at least one characteristics that is also stored in association with the user profile.

In other implementations, a method implemented by one or more processors is set forth as including operations such as receiving a first electronic notification that an automated assistant routine has been initialized at a first client device. The automated assistant routine can correspond to a set of actions to be performed by one or more agents accessible to an automated assistant. The method can further include causing an agent of the one or more agents to initialize performance of an action of the set of actions in furtherance of the automated assistant routine. The action can cause the first client device to render content for presentation to a user, and the content can be based on data generated by the agent in performance of the action. The method can also include receiving a second notification that the user has relocated away from the first client device, and in response to receiving the second notification, causing the rendering of the content at the first client device to at least temporarily stop. The method can further include receiving a third notification that the user has been detected near a second client device, and in response to receiving the third notification, causing the second client device to render additional content, for presentation to the user, in furtherance of the automated assistant routine.

In some implementations, the method can include generating routine instance data in response to receiving the first notification, the routine instance data providing information related to the automated assistant routine, and the routine instance data identifying the first client device and a status of the action being performed by the agent.

In some implementations, the method can include in response to receiving the second notification: modifying the routine instance data to cause the agent to at least temporarily stop performance of the action. The agent at least periodically accesses the routine instance data during performance of the action to determine whether to continue performance of the action.

In some implementations, the method can include, in response to receiving the third notification: modifying the routine instance data to cause the agent to resume performing of the action, or transmitting a command to the agent to cause the agent to resume performing of the action.

In some implementations, the second notification can be received from the first client device in response to the first client device determining, based on sensor data from a sensor that is in communication with the first client device, that the user is no longer detectable near the first client device. In some implementations, the sensor is integral to a third device that is connected to a common network relative to the first client device and the second client device.

In some implementations, the automated assistant routine can be initialized at the first client device in response to the user providing a spoken utterance to an automated assistant interface of the first client device, and wherein causing the first client device to render content for the user comprises causing the first client device to provide audible output from the automated assistant interface of the first client device.

In yet other implementations, a implemented by one or more processors is set forth as including operations such as receiving, at a remote server device, data transmitted from a first client device, and determining, at the remote server device, that the data corresponds to a request for initialization of an automated assistant routine that corresponds to a set of automated assistant actions. The method can also include in response to determining that the data corresponds to the request, generating, at the remote server device, content for an action of the set of automated assistant actions. The method can further include, in response to the data that corresponds to the request for initialization of the automated assistant routine being received from the first client device: transmitting the content for the action to the first client device to cause the first client device to render the content for the action, and determining, at the remote server device during rendering of the content for the action by the first client device, that a user has directly or indirectly indicated an interest in the automated assistant routine being continued at a second client device. The method can also include, in response to determining that the user has indicated the interest in the automated assistant routine being continued at the second client device: rendering, at the second client device, additional data that is in furtherance of the automated assistant routine.

In some implementations, the method can include, in response to the data that corresponds to the request for initialization of the automated assistant routine being received from the first client device, the remote server device stores routine instance data that identifies a status of the automated assistant routine as active at the first client device. Furthermore, in response to determining the interest of the user in continuing the automated assistant routine at the second client device, the remote server device modifies the routine instance data to indicate the automated assistant routine is inactive at the first client device or active at the second client device.

In some implementations, the method can include determining, at the first client device, that the routine instance data has been modified at the remote server device to indicate that the automated assistant routine is inactive at the first client device or active at the second client device. Additionally, the method can include, in response to determining that the routine instance data has been modified, ceasing the rendering of the data at the first client device.

In some implementations, the method can include generating, at the first client device or the remote server device, the routine instance data, wherein the routine instance data further identifies a user or device that initialized the automated assistant routine, a time that the automated assistant routine was initialized, or a status of the action of the set of actions. In some implementations, the additional content can include at least a portion of the data previously rendered at the first client device.

In some implementations, the method can include causing, in response to determining that the user has directly or indirectly indicated the interest in the automated assistant routine being continued at the second client device, the second client device to receive the additional content from a memory buffer of the first client device over a local area network.

In yet other implementations, a method implemented by one or more processors is set forth as including operations such as initializing an automated assistant to perform an automated assistant routine via a first client device. The automated assistant routine can correspond to a set of actions performed by the automated assistant. The method can also include generating routine instance data that provides information related to the automated assistant routine, the information identifying the first client device as an assigned device for the automated assistant routine. The method can further include causing the first client device to render content corresponding to an action of the set of actions in furtherance of the automated assistant routine. The method can also include determining that the user has become less proximate to the first client device, the determining based on sensor data from a sensor that is in communication with the first client device. The method can further include causing the rendering of the content at the first client device to be at least temporarily stopped in response to determining that the user has become less proximate to the first client device. The method can also include modifying the routine instance data to indicate that the automated assistant routine has been at least temporarily stopped at the first client device. The method can further include, when the user has become more proximate to a second client device that is accessible to the automated assistant: causing the automated assistant to resume performing the automated assistant routine via the second client device according to the routine instance data.

In some implementations, modifying the routine instance data comprises modifying the routine instance data to indicate one or more actions of the set of actions have been completed or are in progress when the routine has been at least temporarily stopped.

In some implementations, the method can include, when the user has become more proximate to the second client device: accessing routine permissions associated with the automated assistant routine, determining based on the routine permissions, that the automated assistant routine is permitted to transfer to the second client device.

In some implementations, the method can include, when the automated assistant routine has been resumed at the second client device: causing modification of the routine instance data to indicate that the automated assistant routine has been resumed at the second client device.

In some implementations, generating the routine instance data includes transmitting the information to a remote server device, and wherein modifying the routine instance data includes transmitting a request to the remote server device to modify the routine instance data. In some implementations, the sensor is integral to a third client device that is different than the first client device and the second client device.

In some implementations, causing the automated assistant to resume performing the automated assistant routine via the second client device includes causing the second client device to render additional content corresponding to the action of the set of actions.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

DETAILED DESCRIPTION

Figure 1:
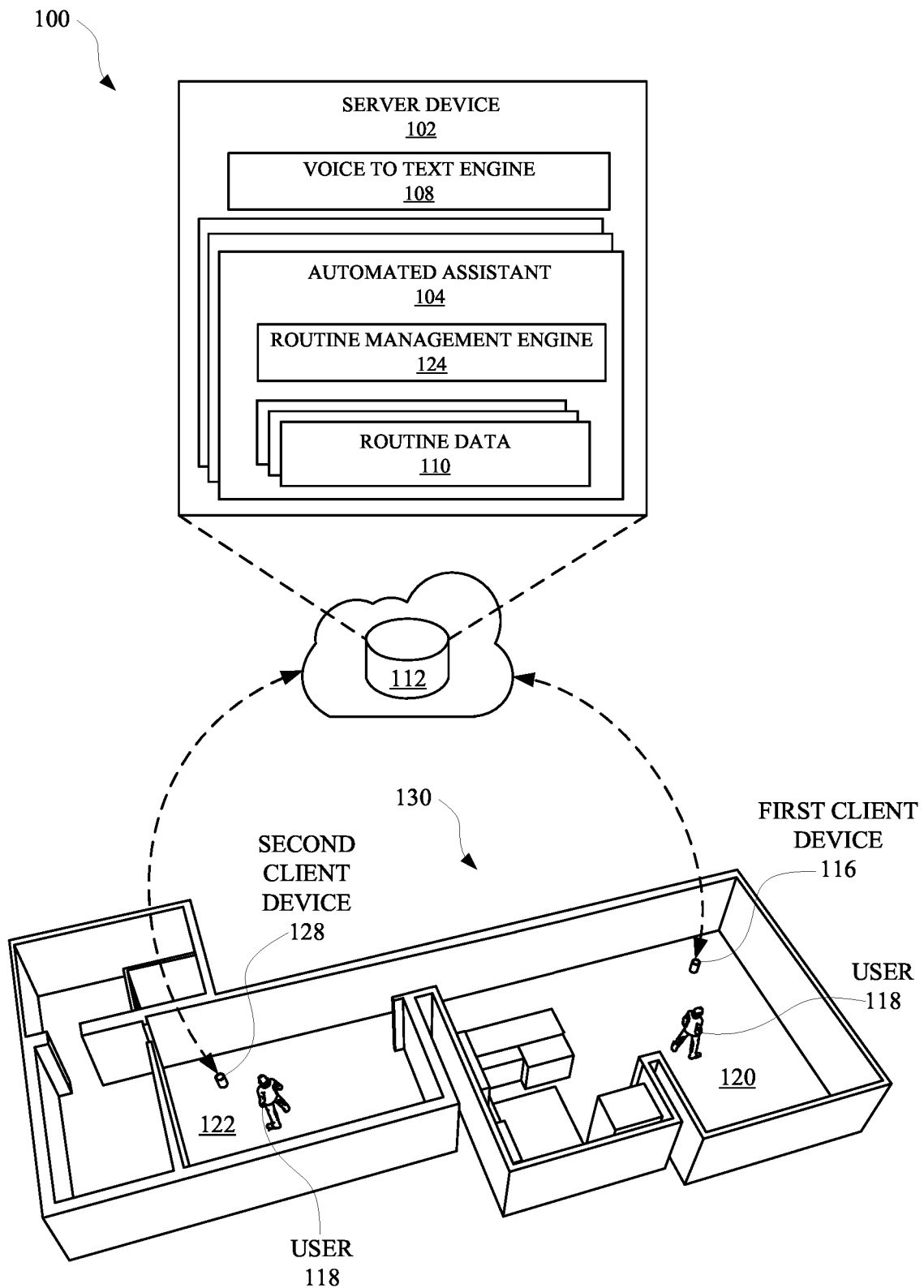
FIG. 1 illustrates a system for transitioning automated assistant routines between devices.

FIG. 1 illustrates a system 100 for transitioning automated assistant routines between devices. The system 100 can include one or more remote automated assistant devices 112, such as at least one remote server device 102. In many implementations, the server device 102 comprises a cluster of "cloud-based" server devices that operate in concert with one another. An automated assistant 104 is illustrated as part of the server device 102, and the server device 102 can implement at least part of the functionality of the automated assistant 104 in various implementations. Although the automated assistant 104 is illustrated in FIG. 1 as part of the server device 102, in many implementations the automated assistant 104 can operate in part via an assistant application that is provided at one or more client devices, such as a client devices 116 and 128, and in part via remote automated assistant components included at the server device 102. For example, in some implementations the first client device 116 and the server device 102 can interface with one another to form a logical instance of an automated assistant that can be interacted with by user 118 via an assistant interface of first client device 116. Further, the second client device 128 and the server device 102 can interface with one another to form another logical instance of an automated assistant that can be interacted with by the user 118 via an assistant interface of the second client device 116.

Further, in many implementations the logical instance of the automated assistant formed via the first client device 116 and the server device 102, and the logical instance of the automated assistant formed via the second client device 128 and the server device 102 may form what appears to be, from a perspective of the user 118, a single logical instance of an automated assistant. For example, in many implementations the user 118 can cause the same and/or similar automated assistant functionalities to be performed in interacting with the automated assistant via either one of the client devices 116 and 128. For instance, the client device 116 and 128 can be associated with one another via, for example, being associated with the same user account (e.g., a user account of the user 118 and/or a separate user), being on the same network, being associated with one another in a stored device topology, etc. As a result, either one of the client devices 116 and 128 can be interacted with by the user 118 to control the same set of peripheral devices, to access content that is personal to and/or tailored to the client device 116 and 128, to initiate performance of an automated assistant routine that is associated with the client devices 116 and 128 (and/or that is associated with the user 118), etc.

Moreover, as described in detail herein, in various implementations an automated assistant routine can be initiated at either one of the client devices 116 and 128. For example, in response to initiation of the automated assistant routine at the first client device 116, content corresponding to at least part of the automated assistant routine can be rendered at the first client device 116 (e.g., rendered exclusively at that client device). Further, in response to determining that the user 118 is no longer near the first client device 116 and/or that the user is near the second client device 128, rendering of content corresponding to the automated assistant routine can be halted at the first client device 116 and/or can be initiated at the second client device 128. For example, in response to determining that the user 118 is no longer near the first client device 116 rendering of any automated assistant routine content at the first client device 116 can be halted. Additionally or alternatively, in response to determining that the user 118 is near the second client device 128, rendering of automated assistant routine content at the second client device 128 can be initiated. For instance, where the rendering of the content at the first client device 116 is halted, the rendering of the content can be resumed at the second client device 128. The rendering of the content at the second client device 128 can be resumed from a point where it was halted at the first client device 116, or resumed from a point that precedes but is near that point (e.g., resumed from 10 seconds before it was halted). Also, for instance, where the rendering of the content at the first client device 116 is not halted, the rendering of the content at the second client device 128 can be initiated to be synchronized with the rendering of the content at the first client device 116.

Although only two client devices 116 and 128 are illustrated in FIG. 1, in many implementations the user 118 can access the automated assistant 104 via additional and/or alternative devices, such as other device(s) in the home 130, a vehicle-based device in a vehicle of the user 118, and/or other device(s) in other structures besides the home 130. Transfer of an automated assistant routine between any of such devices can be effectuated according to implementations disclosed herein. Moreover, various techniques can be utilized to determine that the client devices 116 and 128, and/or other devices having an assistant interface, are linked with one another for at least the purpose of transferring routines between the devices. Such techniques can leverage, for example, user accounts associated with the devices, networks associated with the devices, a device topology that associates the devices with one another and that optionally spatially correlates the devices (e.g., through room definitions), etc.

The user 118 can interact with the automated assistant 104 via an assistant interface of any one of the client devices 116 and 128. The assistant interface receives user interface inputs of a user using one or more modalities, and renders user interface outputs using one or more modalities. User interface input modalities include, for example, typed/touch, spoken, and gesture modalities and user interface inputs for the modalities can be received via, for example, microphone (s) of the client device (spoken modality), a touch screen and/or keyboard of the client device (typed modality), a camera of the client device (gesture modality), etc. User interface output modalities include, for example, audible, graphical, and/or haptic, and user interface output for the modalities can be rendered via, for example, speaker(s) of the client device (audible modality), display device(s) of the client device (visual modality), transducer(s) of the client device (haptic modality), etc. For example, a user can provide user interface input to the automated assistant 104 by providing a verbal, textual, gesture, or graphical input to the assistant interface to cause the automated assistant 104 to perform a function (e.g., provide data, control a peripheral device, access an agent, etc.). Responsive content corresponding to the performed function can then be rendered via speaker(s), display screen(s), and/or other user interface output device(s) of the client device. In some implementations, the client device 116 and/or the client device 128 can include a display device, such as a display panel that includes a touch interface for receiving touch inputs and that can also be driven to render automated assistant output. In some implementations, the client device 116 and/or the client device 128 can lack a display device, thereby providing an audible assistant interface output modality, without providing a graphical user interface output modality.

The client devices 116 and 128 can each be in communication with the server device 102 over a network, such as the internet. The client device 116 and/or 128 can offload computational tasks to the server device 102 to, for example, conserve computational resources at the client devices 116 and/or 128, and/or to leverage more robust resources available at the remote computing device 102. For example, aspects of the automated assistant 104 can be implemented via a local assistant application of the first client device 116 and interface with the server device 102 that implements other aspects of the automated assistant 104. For instance, the local assistant application can optionally include one or more local speech-to-text engines, one or more local text-to-speech engines, and/or other local engines that supplement or replace engine(s) of the server device 102. The server device 102 can optionally serve a plurality of users and their associated assistant applications via multiple threads. In implementations where aspects of the automated assistant 104 are implemented via a local assistant application of a client device, the local assistant application can be an application that is separate from an operating system of the client device (e.g., installed "on top" of the operating system)—or can alternatively be implemented directly by the operating system of the client device (e.g., considered an application of, but integral with, the operating system).

In some implementations, the sever device 102 can perform automatic speech recognition, where audio data provided by a client device is converted to a semantic representation of the audio data (e.g., text). For example, the server device 102 can include a voice to text engine 108 (also referred to as a speech-to-text engine or STT engine) that can process audio data received at an assistant interface to identify the text embodied in the audio data. The process for converting the audio data to text can include a speech recognition algorithm, which can employ neural networks and/or statistical models for identifying groups of audio data corresponding to words or phrases. As one non-limiting example, audio data can be processed using one or more trained acoustic models (e.g., a neural network model with one or more long short-term (LSTM) layers) to generate phones and/or phonemes that are present in the audio data, and the phones and/or phonemes analyzed to generate text that corresponds to the phones and/or phonemes. The text converted from the audio data can be further processed by additional components at the server device 102 in determining an appropriate automated assistant response for the audio data. The further processing can include processing by a natural language understanding engine to determine a semantic intent indicated by the text and/or one or more associated values, and the semantic intent can be utilized to generate responsive content. For example, responsive content can be generated based on transmitting, to an agent, a command that includes an indication of the intent and the associated values, and receiving the responsive content in response. The further processing can additionally or alternatively include processing by the routine management engine 124, described in more detail below.

The user 118 can initialize an automated assistant routine through input provided at an assistant interface of the first client device 116 or the second client device 118, in order to cause the automated assistant 104 to perform a variety of different actions of a corresponding automated assistant routine. The routine management engine 124 can compare the input to routine data 110 that includes a mapping of inputs to corresponding actions. Various types of input can be provided to initiate the performance of a corresponding routine, such as spoken input of a condensed phrase for the routine, typed input of the condensed phrase, a user tapping on a graphical user interface element for the routine, a gesture for the routine (e.g., a hand wave and/or a physical motion of the user detected via a camera and/or other sensors), etc. In some implementations, the automated assistant can perform a routine without explicit user interface engagement from the user. For instance, the automated assistant can perform a routine in response to a client device detecting presence of a user within a particular time period or detecting a voice of the user within a particular time period (e.g., performing a "good morning" routine in response to detecting a presence of the user between 7-9 AM).

Interactions between one or more users and the automated assistant 104 can be stored (e.g., temporarily) as routine data 110 and/or user data 106, which can each be stored at the server device 102, the first client device 116, and/or the second client device 128. The routine data 110 can, for example, provide correspondence data that identifies one or more inputs received from one or more users and one or more routines to be performed by the automated assistant 104. A routine can correspond to a set of actions to be performed by the automated assistant 104, separate agent(s), a separate device from the server device 102, and/or any other application and/or device capable of interacting with the automated assistant 104.

A routine can be performed at the direction of the automated assistant 104 and can be controlled by one or more users during performance of the routine. A status of a routine can be stored at the remote device 112, which can include a database for storing the routine data 110. The routine data 110 can include routine instance data such as routine identifiers, status identifiers, location identifiers, device identifiers, and/or any other information that can be used to characterize properties of a routine.

Initially, when a user requests that a routine be initialized, a command can be received by the assistant interface of a first client device 116. The automated assistant 104 can acknowledge the command being received at the assistant interface and generate routine data 110 for the routine. In some implementations, the automated assistant 104 can receive the command from the user and perform a query to identify a routine that corresponds to the command. When the routine has been identified, the automated assistant 104 can cause a routine management engine 124 to access the database and modify a status identifier associated with the routine to indicate that the routine is active (e.g., "modify routine.current_routine.status='1'").

When the user initializes a routine at the assistant interface, the automated assistant 104 can identify a set of actions associated with the routine and delegate each action of the set of actions accordingly. For example, at least one action in the set of actions can be performed at least in part by an agent that is hosted at a separate computing device. Therefore, the automated assistant 104 can communicate with the agent to cause the agent to begin performing the action. In performing the action, the agent can cause the first client device 116 to render content generated by the agent. The agent can interface with the first client device 116 directly in causing the first client device 116 to render the content, or can provide the content to the automated assistant 104, which causes the first client device 116 to render the content (or a conversion thereof—such as a text-to-speech conversion thereof). The automated assistant 104 can optionally task the agent to access the database one or more times (e.g., periodically) during the performance of the action to update one or more status identifiers associated with the action and/or routine, in order to indicate a status of the respective action and/or routine.

During performance of the action of the set of actions for the routine, the user 118 can relocate away from the device that the routine was initialized at. For example, when the user 118 has initialized the routine in a first room 120 of their home, the user 118 can elect to move to a second room 122 of their home. The first room 120 can include the first client device 116, and the second room 122 can include the second client device 128. In some implementations, the first client device 116 can determine a degree to which the user 118 is proximate to the first client device 116 using one or more signals from one or more sensors. For example, the first client device 116 can be in communication with an audio, video, tactile, temperature, location, Bluetooth, and/or any other type of sensor capable of providing sensor data that can be used to determine, with permission from the user 118, a location of the user 118 and/or whether the user 118 is near the sensor. As a degree of proximity of the user 118 decreases relative to the first client device 116, the automated assistant 104 can be responsive to the change in proximity of the user 118 by pausing the action and/or routine being performed by the automated assistant 104. For example, an automated assistant application at the first client device 116 and/or remote automated assistant components at the server device 102 can utilize the sensor data to determine that no user is detected within a threshold distance of the first client device 116, that no user is detected at all near the first client device 116, and/or that the particular user 118 is not detected within a threshold distance of, or at all near, the first client device 116. Furthermore, based on such a determination, the automated assistant 104 can cause rendering of content related to the routine to be paused at the first client device 116. The pausing of the rendering of the content can be performed by the automated assistant application at the first client device 116 (e.g., by halting the rendering of any buffered content and/or sending a command to the remote server device 102 to cause any streaming of content to halt) and/or by the remote automated assistant component(s) at the server device 102 (e.g., by sending a command to the first client device 116 to cause the halting of the rendering of any buffered content and/or ceasing the streaming of any routine content to the first client device 116). Further, the automated assistant 104 can provide a signal to the routine management engine 124 indicating that the user 118 has become less proximate to the first client device 116 and/or indicating that the routine and/or action has been paused.

The routine management engine 124 can update the routine data 110 accordingly. For example, the routine management engine 124 can cause the routine data 110 to be updated to reflect that the automated assistant routine and/or action has been paused. In some implementations, the routine management engine 124 can update the routine data 110 to reflect that rendering of content of the routine at the first client device 116 was paused, to reflect a status of the routine when it was paused (e.g., which action(s) had been performed, which content had been rendered, etc.), and/or to indicate a time stamp corresponding to a time at which the routine was paused. The time stamps for multiple different paused routines can be tracked in order to determine when to expire or otherwise render a particular paused routine unable to be resumed. For instance, when a particular time stamp for a paused routine reached a predetermined threshold, the paused routine can be designated as unable to be resumed. In this way, a routine, such as a morning routine, that remains paused for a threshold period (e.g., 24 hours) will not be resumed the following day, thereby preventing the user from missing out on actions that may cause different data to be rendered on different days (e.g., an action for reading a daily schedule to a user).

When the user 118 has moved away from the first client device 116, thereby causing the routine to be paused, the user 118 can move more proximate to the second client device 128 in the second room 122, as provided in FIG. 1. Presence of the user near the second client device 128 can be determined by the automated assistant 104 based on sensor data from one or more sensors (that are in addition to and/or the same as those optionally utilized to determine the user 118 is less proximate to the first client device 116). For example, an automated assistant application at the second client device 116 and/or remote automated assistant components at the server device 102 can utilize the sensor data to determine that the user is within a threshold distance of the second client device 128, that any user is detected at all near the second client device 128, and/or that the particular user 118 is detected within a threshold distance of, or at all near, the second client device 128. Furthermore, based on such a determination, the automated assistant 104 can cause rendering of content related to the routine to be resumed at the second client device 128. For example, the server device can cause content related to the routine to be transmitted to the second client device 128 for rendering, optionally relying on the stored status of the routine when it was paused to determine which content to be provided for rendering (e.g., thereby causing the content to pick up where it left off, or shortly before where it left off).

In various implementations, in response to determining that the user 118 is present near the second client device 128, the routine management engine 124 can perform a query of the routine data 110 to determine whether a status of any routine (corresponding to the user 118 and/or the client device 128) is indicated as paused or inactive (e.g., "modify routine.current_routine.status='0'"). The routine management engine 124 can, for example, determine that a given routine has been paused, and as a result of determining the user 118 is present near the second client device 128 and that the user 118 and/or the second device are associated with the given routine, cause the automated assistant 104 to cause resumption of the routine via the second client device 128. For example, the routine management engine 124 can provide the automated assistant 104 an indication of the status of the routine when it was paused, and can cause the routine to be resumed based on is status when it was paused.

As one example, if the routine was paused at the two minute mark of a current podcast for an action of the routine, the automated assistant 104 can cause the podcast to be rendered at the second client device 128, starting at or near (e.g., with 5, 10, or 15 seconds of) the two minute mark. The automated assistant 104 can optionally store the podcast locally to enable resumption of its rendering, or can interface with an agent to cause the resumption of its rendering. For instance, the automated assistant 104 can provide a command to the agent to cause it to continue providing the podcast (directly to the client device or via the server device 102). Also, for instance, the automated assistant 104 can cause the routine management engine 124 to update the routine data 110 to reflect that the podcast action is again active, and the agent can access the routine data 110 (e.g., via an API) to determine that the podcast is again active and resultantly resume provision of the podcast (directly to the client device or via the server device 102).

As another example, if the routine was paused after completion of rendering of first content corresponding to a first action of the routine, but before any rendering of second content corresponding to a second action of the routine, the automated assistant 104 can cause the second content to be rendered at the second client device 128. For instance, the automated assistant 104 can provide a command to an agent associated with the second action to cause it to generate and/or provide the second content. Also, for instance, the automated assistant 104 can cause the routine management engine 124 to update the routine data 110 to reflect that the routine is again active and that the second action is ready to be performed, and the agent can access the routine data 110 (e.g., via an API) to determine that the second action is ready to be performed and resultantly generate and/or provide the second content. As yet another instance, the second agent may have already provided the second content to the server device 102, the server device 102 may have buffered the content, and the automated assistant 104 can access the buffered content to cause its rendering via the second client device 128.

In these and other manners, the user 118 will be able to move about their home 130 and/or to other environments that include assistant device(s) linked with the client devices 116 and 128, while content from a routine is transferred between various assistant device(s) to enable the user 118 to perceive content pertaining to the entirety of the routine. This can enable the user to perceive the entirety of the content, thereby mitigating the need for the user 118 to again request an additional computationally intensive performance of the routine. Additionally or alternatively, in implementations where rendering of content of a routine is halted at a prior assistant device when transferred to another assistant device, resource consumption at the prior assistant device can be lessened through such halting, which prevents the prior assistant device from continuing to unnecessarily render content of the routine.

Figure 2:
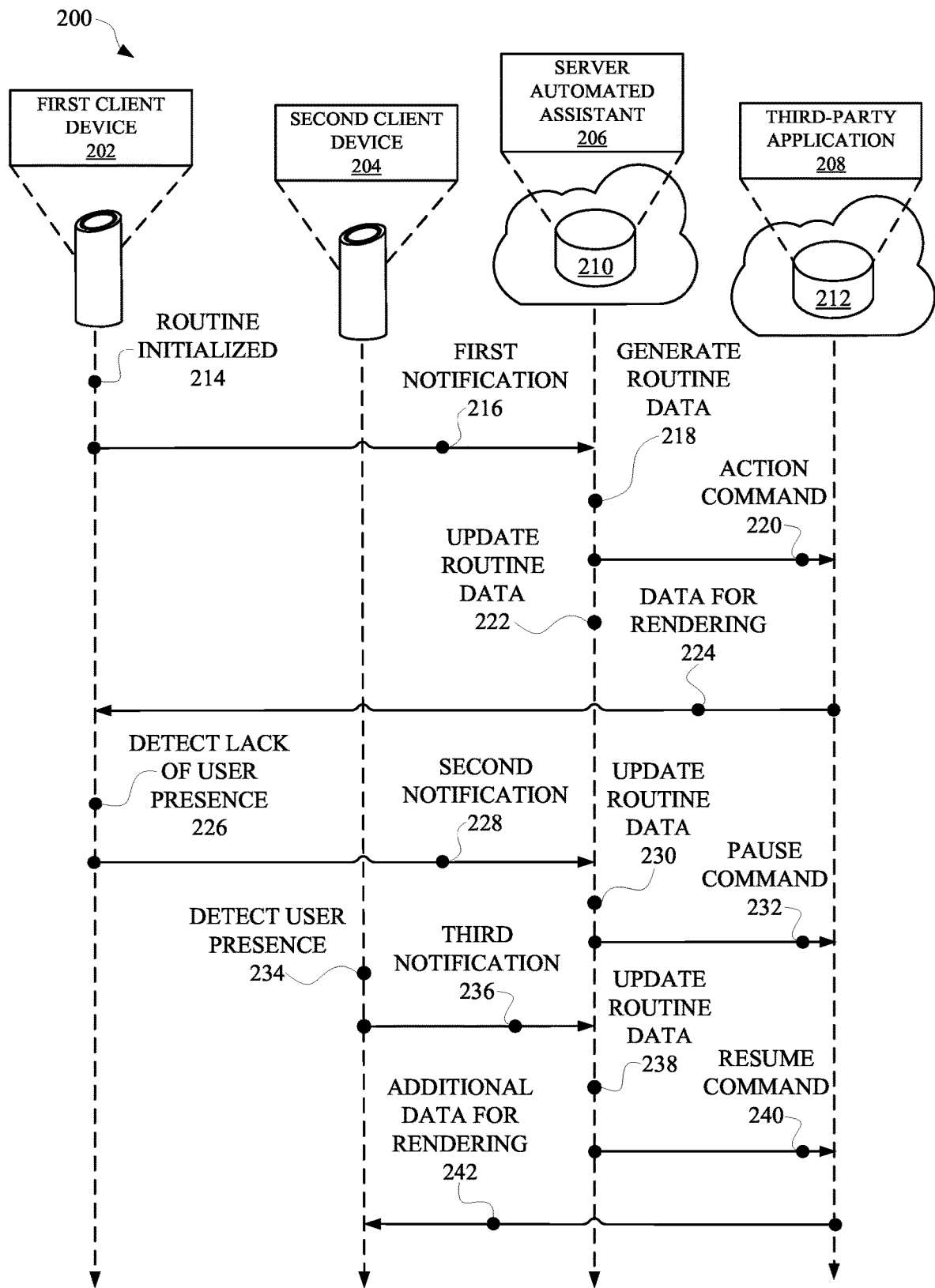
FIG. 2 illustrates a state diagram for transferring a routine between client devices based on movement of a user between the client devices.

FIG. 2 illustrates a state diagram 200 of one example of transferring a routine between client devices based on movement of a user between the client devices. The state diagram 200 can be embodied as instructions that are executable by one or more processors. The state diagram 200 details communications between a first client device 202, a second client device 204, a server automated assistant 206, and a third-party agent 208. Although a particular interaction between components is illustrated in FIG. 2, in various implementations certain operations indicated as being performed by a respective component can additionally or alternatively be performed by an alternative component. For example, some operations performed by first client device 202 can instead be performed by server automated assistant 206, and vice versa. Each of the server automated assistant 206 and the agent 208 can be at least partially hosted at a first remote device 210 (e.g., cluster(s) of cloud-based servers) and a second remote device 212, respectively. The server automated assistant 206 can be accessible to each of the first client device 202, the second client device 204, the first remote device 210, and/or the agent 208. Furthermore, a user can interact with an automated assistant via an automated assistant interface at either the first client device 202 and/or the second client device 204. For instance, the user can initialize the automated assistant to perform a routine via an automated assistant interface of the first client device 202. A routine can be a set of actions that can be performed at the direction of the automated assistant optionally via interaction with one or more agents that are accessible to the automated assistant.

When a routine is initialized at operation 214 of the state diagram 200, the first client device 202 can transmit a first notification to the first remote device 210, according to operation 216. The first notification can provide an indication that a user has initialized a routine, thereby allowing the server automated assistant 206 to identify the particular routine that has been initialized. In some implementations, the first client device 202 can send audio data corresponding to a spoken utterance of the user, and the first remote device 210 can process the audio data to determine that the audio data corresponds to a routine, such as a routine that is stored in association with the user and/or the first client device 202. In this manner, the spoken utterance of the user at the first client device 202 can initialize the routine at the first client device 202. In response to the server automated assistant 206 identifying the routine based on its initialization at the first client device 202, the server automated assistant 206 can generate routine data according to operation 218. Specifically, the routine data can identify at least the first client device 202 and the routine that has been initialized. In some implementations, the routine data can indicate a user that initialized the routine. For example, an identifier associated with the user can be determined and the identifier included in the routine data. The identifier associated with the user can be determined, for example, based on matching a voice signature stored in association with the identifier to a voice signature captured by the audio data captured at the first client device 202 and/or based on other sensor data captured at the first client device 202 (e.g., image(s) from a camera).

In response to receiving the first notification, the first remote device 210 can provide an action command to the agent 208 according to operation 220. The action command can include a request for the agent 208 to initialize performance of an action of the set of actions corresponding to the routine initialized at the first client device 202. For example, the agent 208 can be a scheduling agent for providing information related to a schedule of the user for a particular day. In response to receiving the action command, the agent 208 can begin performing the action. Furthermore, the server automated assistant 206 can update the routine data according to operation 222, in order to reflect that the routine has been initialized and/or that the agent 208 has begun performing a corresponding action of the routine. Furthermore, as part of the action, the agent 208 can provide content for rendering at the first client device 202 according to operation 224. For example, the agent 208 can cause the first client device 202 to provide an audio output corresponding to a schedule of the user for a particular day. In some implementations, the agent 208 provides the data to server automated assistant 206, which then provides the data (or a conversion thereof) to the first client device 202 for rendering by the first client device 202.

While the first client device 202 is rendering the content corresponding to the action, the first client device 202 can detect a lack of presence of the user according to operation 226. For example, the first client device 202 can include, and/or be in communication with, one or more sensors capable of detecting lack of presence of the user. The first client device 202 can determine lack of presence of the user based on sensor data from one or more of the sensors. In response to determining the lack of presence of the user, the first client device 202 can provide a second notification to the first remote device 210 according to operation 228. The second notification can provide an indication that the user is no longer perceiving the rendered data, is no longer proximate to the first client device 202, and/or has otherwise indicated directly or indirectly they are temporarily unavailable at the first client device 202. In some other implementations, the first remote device 210 can determine the lack of user presence near the first client device 202 based on received sensor data from the first client device 202 and/or from other sensors that are near the first client device 202. Other sensors that are near the first client device 202 can include, for example, sensor(s) of IoT devices and the sensors can optionally be determined to be near the first client device 202 based on a device topology (e.g., based on a user defined and/or automatically determined device topology that identifies the first client device 202 and the sensors as being in the same room).

In response to receiving the second notification, the first remote device 210 can initialize at least temporarily suspending the routine and/or the action being performed by the agent 208, and/or any other application or device performing an action in furtherance of the routine. For instance, the server automated assistant 206 can cause the routine data to be updated according to operation 230. The routine data can be updated to reflect that the routine is to be paused or has been paused, and/or identify one or more actions of the set of actions have been or will be paused. In some implementations, the routine data can be updated to identify a status of the routine when it was paused, a time at which the second notification was received or the routine was paused, a device that caused the routine to be paused, a user that caused the routine to be paused, and/or any other information that can be associated with an automated assistant routine. The first remote device 210 can transmit a pause command to the second remote device 212, according to operation 232, in order to cause the agent 208 to at least temporarily pause provisioning of data for rendering by the first client device 202. Additionally or alternatively, the first remote device 210 can transmit a pause command to the first client device 202 to cause the first client device 202 to halt rendering of any data already provided to the first client device 202 for rendering (e.g., to halt audible rendering of any not yet rendered audible content and/or to halt rendering of any currently rendered visual content).

While the routine is at least temporarily paused (e.g., for a time period t after determining the lack of user presence at the first client device), the second client device 204 can detect a presence of the user according to operation 234. The second client device 204 can include, and/or be in communication with, one or more sensors capable of detecting lack of presence of the user and can determine presence of the user based on sensor data from one or more of the sensors. In response to determining presence of the user, the second client device 204 can provide a third notification to the first remote device 210 according to operation 236. For example, the user can walk from a first room that includes the first client device 202 to a second room that includes the second client device 204. As a result, the second client device 204 can detect a presence of the user in the second room, with permission from the user, using one or more sensors, such as an audio, video, motion, temperature, and/or any other sensor modality. The third notification can provide an indication that the user is proximate to the second client device 204, and/or has otherwise indicated directly or indirectly they are currently available at the second client device 204. In some other implementations, the first remote device 210 can determine presence near the second client device 204 based on received sensor data from the second client device 204 and/or from other sensors that are near the second client device 204.

The first remote device 210 can receive the third notification and, in response, update the routine data according to operation 238. The routine data can be updated to indicate that the routine has been or will be resumed, and/or that the action has been or will be resumed. Furthermore, in response to receiving the third notification, the first remote device 210 can transmit a resume command to the second remote device 212 according to operation 240. The resume command can cause the agent 208 to resume performing the action that the agent 208 was previously performing in furtherance of the routine. However, because the user was detected at the second client device 204, the resume command can include an identifier for the second client device 204, thereby putting the agent 208 on notice that any additional data should be provided for rendering at the second client device 204, such as according to operation 242. This can be helpful when the first client device 202 and the second client device 204 have different modalities for presenting data. For instance, if the first client device 202 is an assistant device with no display panel, and the second client device 204 is a tablet computing device, the agent 208 can render data that includes imaging data for the second client device 204. Additionally or alternatively, the first remote device 210 can cause any additional data to be provided for rendering at the second client device 204, without first transmitting any command to the agent 208. For example, the additional data can already be buffered at the first remote device 210 (e.g., buffered in anticipation of providing it to the first client device 202 initially, but for the pausing of the routine) and the first remote device 210 can cause the buffered additional data to be transmitted to the second client device 204 for rendering by the second client device 204.

In some implementations, a different user can be engaging with the automated assistant at the second client device 204 and the user can be detected by the second client device 204 regardless. However, because the different user is already engaging with the automated assistant at the second client device 204, the automated assistant can bypass resuming the routine until the different user is no longer engaging with the automated assistant, or a presence of the different user is no longer detected by the second client device 204. When the different user is no longer detected at the second client device 204, the operation 236 can be performed, along with the latter operations relative to operation 236. For instance, the routine data can initially indicate that the different user was engaging the automated assistant at the second client device 204. However, when the different user has completed engaging with the automated assistant and the user has been detected by the second client device 204, the routine data can be updated to indicate that the previously paused routine will be resumed.

In some implementations, the transfer of an automated assistant routine can be performed based on the user being detected near the second client device 204, without consideration of determining lack of presence of the user near the first client device 202 (e.g., without any determining of the lack of presence of the user near the first client device 202 even occurring). In this way, the first client device 202 (and/or the first remote device 210) does not necessarily need to monitor for a presence of the user while content of an automated assistant routine is initially being rendered at the first client device 202. In some implementations, the second client device 204 can perform a portion of the routine simultaneous to the first client device 202 performing a portion of the routine. For instance, when an action of the set of actions for a routine includes rendering audio data for a user at the first client device 202, and the user is detected near the second client device 204, the audio data can be simultaneously rendered at both the first client device 202 and the second client device 204. Additionally, or alternatively, a volume of the audio projected by the first client device 202 can be gradually decreased and a volume of the audio projected by the second client device 204 can be gradually increased. The amount of increase and/or decrease can optionally be proportional to an estimated distance from the second client device 204 and/or the first client device 202, respectively. In this way, the user will perceive a gradual change in the audio, rather than a discrete pause at the first client device 202 when the user is moving toward the second client device 204.

In some implementations, a sensor that provides sensor data that indicates whether the user is near the first client device 202 and/or near the second client device 204 can be in communication with, or integral to, a third client device. The third client device can be connected to a common local area network to which the first client device 202 and the second client device 204 are also connected. For example, the third client device can be an "internet of things" (IoT) device capable of monitoring certain features of a home of the user, such as, but not limited to, a thermostat that monitors temperature, or a security system that monitors motion. In this way, signals for triggering a transfer of an automated assistant routine can be provided from multiple different devices, rather than solely from devices that host an automated assistant client application.

In some implementations, a user, group of users, an assistant client device, and/or a group of assistant client devices (e.g., all within a structure such as a home) can be linked (e.g., in one or more databases) with a plurality of disparate IoT devices to enable interaction with (e.g., control of) the IoT devices via automated assistants. For instance, each of multiple assistant client devices in a household can be linked to each of multiple disparate IoT devices in the household to enable any user (or a restricted group of users) to interface with any one of the assistant client devices to interact with any one of the multiple disparate IoT devices.

One example of such linking is a device topology representation that can be user created, and/or automatically created, and that may define various assistant client devices, various IoT devices, identifier(s) for each, and/or attribute(s) for each. For example, the identifier(s) for a device can specify a room (and/or other area(s)) of a structure in which the device is located (e.g., living room, kitchen) and/or can specify nickname(s) and/or aliase(s) for the device (e.g. couch lamp, front door lock, bedroom speaker, kitchen assistant, etc.). In this manner, the identifiers of devices can be names, aliases, and/or locations of the respective devices that the user is likely to associate with the respective devices. As described herein, such identifier(s) can be utilized in various implementations disclosed herein. For example, presence near a given assistant client device can be determined based on sensor data from a given IoT device based on the given assistant client device and the given IoT device both being associated with an identifier that indicates they are both located in the same room.

In some implementations, an automated assistant routine can be associated with permissions that identify limitations on the transferability of an automated assistant routine. For example, the automated assistant routine can be associated with a permission that identifies a set of users that can cause the transfer of a routine. In this way, if multiple people are near the first client device 202 when the automated assistant routine is initialized, and a person that is not identified in the set of users walks away from the first client device 202, the person will not trigger the pausing or transfer or the automated assistant routine. Additionally, or alternatively, the automated assistant routine can be associated with a permission that identifies one or more devices that the automated assistant routine can and/or cannot be transferred to. In this way, the automated assistant routine can be prevented from disturbing a person that is using a device that is identified in the permissions as not being a transferee of the automated assistant routine.

In some implementations, when an automated assistant routine is transferred while the first client device 202 is rendering data for the user, the first client device 202 can buffer some amount of data in a memory of the first client device 202. The buffered data can be arranged for subsequently rendering to the user at the first client device 202. However, if the user causes a transfer of the automated assistant routine to the second client device 204, the buffered data can be transmitted over a local area network, from the first client device 202 to the second client device 204. In this way, the second client device 204 does necessarily need to re-request the data for rendering in furtherance of the automated assistant routine. Rather, if the data has already been downloaded to a local device on a network that is common relative to the second client device 204, the second client device 204 can receive the downloaded data from the local device.

Figure 3:
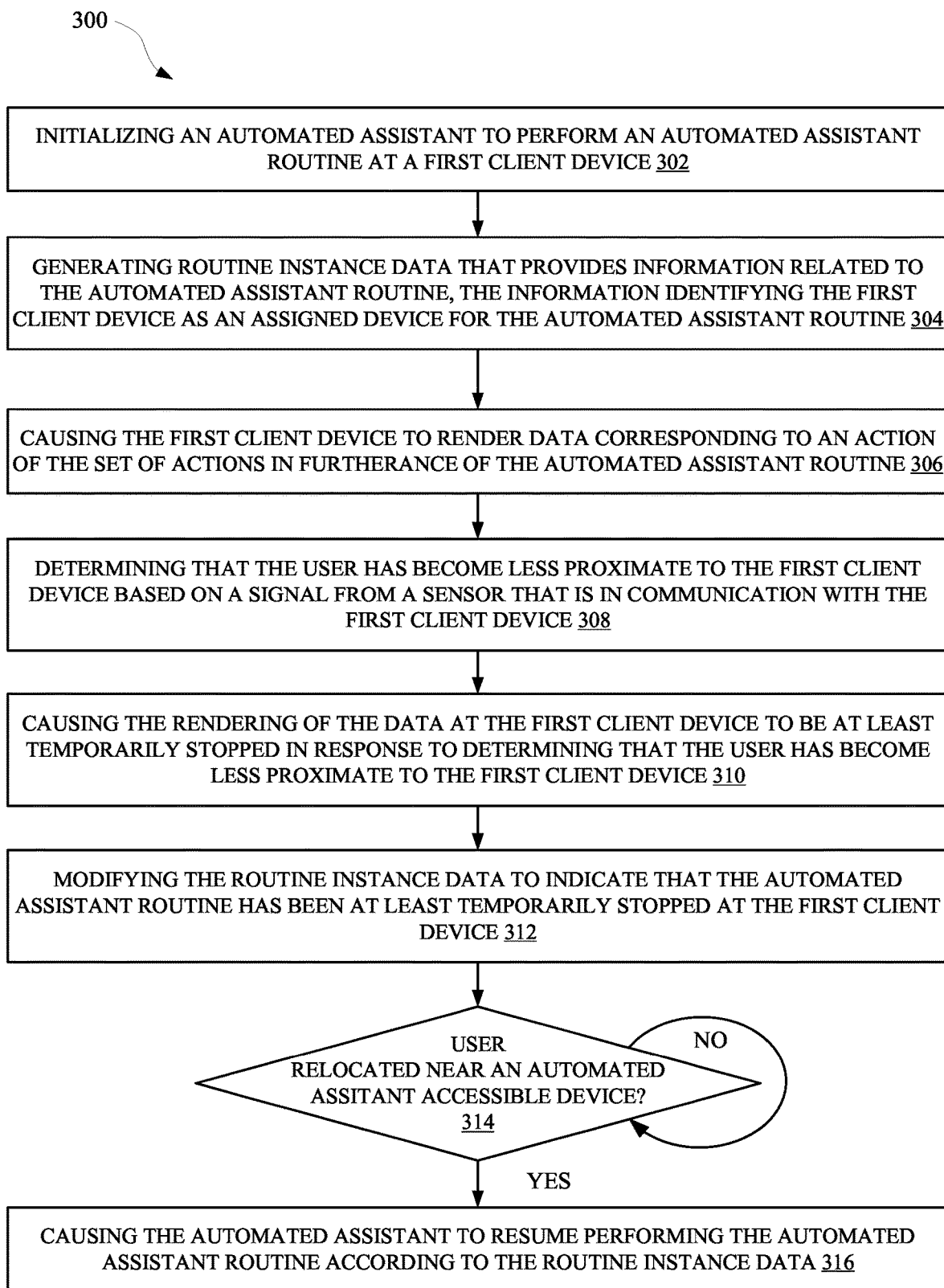
FIG. 3 illustrates a method for causing an automated assistant routine to be transferred between client devices.

FIG. 3 illustrates a method 300 for causing an automated assistant routine to be transferred between client devices. The method 300 can be performed by one or more computing devices, applications, and/or any other apparatus or module capable of interacting with an automated assistant. The method 300 can include an operation 302 of initializing an automated assistant to perform an automated assistant routine at a first client device. The automated assistant can be accessible to the first client device and a second client device, which can optionally be connected to the same network as the first client device. The automated assistant can initialize performance of the automated assistant routine in response to receiving a natural language input at an automated assistant interface of the first client device. For instance, a user can provide a spoken utterance such as, "Assistant, start my cleaning routine," to an automated assistant interface of the first client device. In response, the automated assistant can access a database of routines in order to identify a routine that corresponds to the routine identified in the spoken utterance.

The method 300 can further include an operation 304 of generating routine instance data that provides information related to the automated assistant routine. The information can identify the first client device as an assigned device for the automated assistant routine. In some implementations, the routine instance data can be generated at the first client device and transmitted to a database that is accessible to multiple different client devices associated with an account of the user. The routine instance data can provide an identifier for the first client device such as "Instance_Data: assistant.routine.active='1'; assistant.routine.deviceID='1'" wherein the "assistant.routine.active" variable indicates that the automated assistant routine is active, and the "assistant.routine.deviceID" indicates an identifier for the first client device "1."

The method 300 can also include an operation 306 of causing the first client device to render content corresponding to an action of the set of actions in furtherance of the automated assistant routine. The automated assistant routine can correspond to a "cleaning" routine, which a user can request when cleaning their house. The "cleaning" routine can include actions such as: causing a music agent to play a "cleaning" playlist, initialing a cleaning appliance (e.g., a robotic vacuum), and forwarding phone calls to an assistant device. Therefore, the action of the set of actions can cause audible music to be rendered at the client device, where the audible music is provided by the music agent.

The method 300 can further include an operation 308 of determining that the user has become less proximate to the first client device. The determination at operation 308 can be performed based on one or more signals from one or more sensors that are in communication with the first client device. For instance, a proximity sensor can be integral to, or remote from, the first client device, and provide the first client device with a signal in response to a detected motion of the user. The signal can be processed by the first client device to determine whether the user is moving toward or away from the first client device, with permission from the user. In some implementations, the sensor can be an audio, video, tactile, temperature, and/or any other modality for a sensor that can be responsive to a user. In this way, the automated assistant can access data from such a sensor in order to determine whether to continue performing a particular routine, cause the routine to be transferred to another device, and/or at least temporarily pause a routine until the user is available.

The method 300 can also include an operation 310 of causing the rendering of the data at the first client device to be at least temporarily stopped in response to determining that the user has become less proximate to the first client device. The routine can also be at least temporarily stopped in response to determining that the user has become less proximate to the first client device. In this way, the automated assistant can ensure that the user does not miss any rendered data, which may be especially important when a routine includes rendering a daily schedule, audibly providing a received message, and/or issuing any other important content. In some implementations, the first client device can identify a portion of the rendered data that was most recently rendered (e.g., the latest t seconds of rendered data, where t is any positive number) in order that the most recently rendered data can be repeated when the user causes the routine to be resumed.

The method 300 can also include an operation 312 of modifying the routine instance data to indicate that the automated assistant routine has been at least temporarily stopped at the first client device. In some implementations, the modifying the routine instance data can include transmitting data to a remote server device to cause a table accessible to the remote server device to include an entry that indicates the automated assistant routine has been paused. The remote server device can host the routine instance data, and therefore provide information such as a status of the automated assistant routine, a device at which the automated assistant routine was most recently active, one or more devices that have permission to receive and/or transfer the routine, a time at which the automated assistant routine was initialized, a time at which the automated assistant routine was paused, a user that initialized the automated assistant routine, a user that paused the automated assistant routine, and/or any other data that can be associated with an automated assistant routine.

The method 300 can further include an operation 314 of determining whether a user has relocated near an automated assistant-accessible device. The determination at operation 304 can be performed by the first client device, the remote server device, a second client device, and/or any other device or apparatus capable of interacting with an automated assistant. For instance, in some implementations the second client device can provide an indication to the remote server device in response to detecting that the second client device has been detected at or near the second client device. The second client device can determine that the user is at or near the second client device using one or more signals from one or more sensors that are in communication with the second client device. When the remote server device receives the indication from the second client device, the remote server device can perform a query to determine whether there are any paused automated assistant routines. When the remote server device determines that there is a paused automated assistant routine, the remote server device can push the routine instance data to the second client device. In response, the second client device can process the routine instance data and invoke the automated assistant for unpausing the automated assistant routine.

The method 300 can also include an operation 316 of causing the automated assistant to resume performing the automated assistant routine according to the routine instance data. For example, because the routine instance data indicates that the automated assistant routine was paused while rendering the content corresponding to an action of the set of actions, the automated assistant can proceed with rendering additional content corresponding to the action of the set of actions. In some implementations, if some amount of the previously rendered content was not received by the user because the user walked away from the first client device, the automated assistant can cause the second client device to render the previously rendered content. Otherwise, the second client device can render any additional content corresponding to the action, and initialize performance of any other action of the set of actions, at least until the user relocates near a different automated assistant device, or otherwise indicates an unwillingness to continue the automated assistant routine at the second client device.

Figure 4:
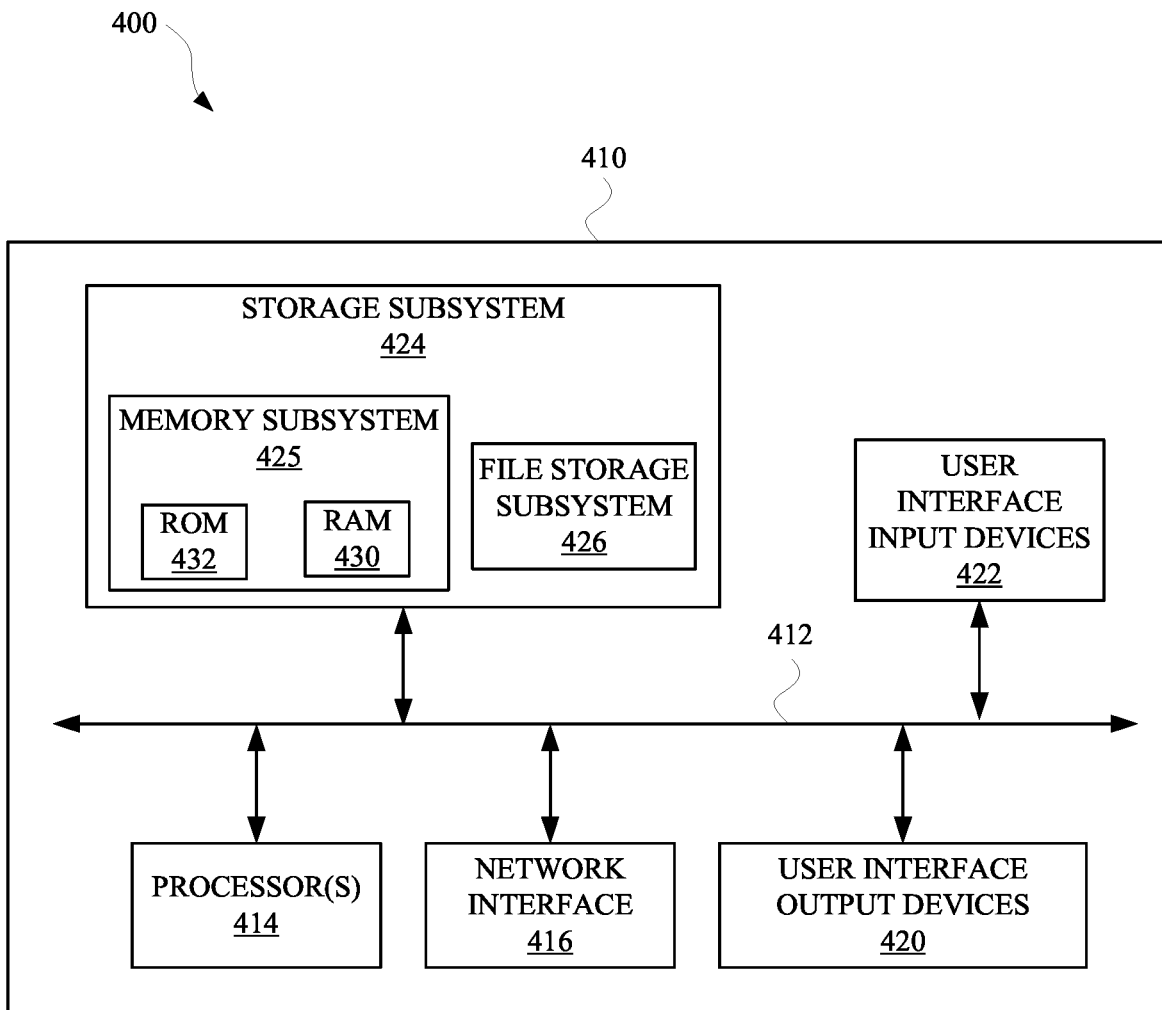
FIG. 4 is a block diagram of an example computer system.

FIG. 4 is a block diagram of an example computer system 410. Computer system 410 typically includes at least one processor 414 which communicates with a number of peripheral devices via bus subsystem 412. These peripheral devices may include a storage subsystem 424, including, for example, a memory 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, any operation(s) discussed herein, and/or to implement one or more of the server device 102, an automated assistant, the remote device 112, the first client device 116, the first client device 202, the second client device 128, the second client device 204, the third party agent 208, the first remote device 210, the second remote device 212, and/or any other device or application discussed herein.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed:

1. A method implemented by one or more processors, the method comprising:
receiving, at a remote server device, data transmitted from a first client device;
determining, at the remote server device, that the data corresponds to a request for initialization of an automated assistant routine that corresponds to a set of automated assistant actions;
in response to determining that the data corresponds to the request, generating, at the remote server device, content for an action of the set of automated assistant actions;
in response to the data that corresponds to the request for initialization of the automated assistant routine being received from the first client device:
transmitting the content for the action to the first client device to cause the first client device to render the content for the action;
determining, at the remote server device during rendering of the content for the action by the first client device, that a user has directly or indirectly indicated an interest in the automated assistant routine being continued at a second client device; and
in response to determining that the user has indicated the interest in the automated assistant routine being continued at the second client device:
rendering, at the second client device, additional data that is in furtherance of the automated assistant routine, wherein the additional data includes additional action data that is based on an additional action of the set of automated assistant actions corresponding to the routine.

2. The method of claim 1, wherein in response to the data that corresponds to the request for initialization of the automated assistant routine being received from the first client device, the remote server device stores routine instance data that identifies a status of the automated assistant routine as active at the first client device; and wherein in response to determining the interest of the user in continuing the automated assistant routine at the second client device, the remote server device modifies the routine instance data to indicate the automated assistant routine is inactive at the first client device or active at the second client device.

3. The method of claim 2, further comprising:
determining, at the first client device, that the routine instance data has been modified at the remote server device to indicate that the automated assistant routine is inactive at the first client device or active at the second client device; and
in response to determining that the routine instance data has been modified, ceasing the rendering of the data at the first client device.

4. The method of claim 2, further comprising:
generating, at the first client device or the remote server device, the routine instance data, wherein the routine instance data further identifies a user or device that initialized the automated assistant routine, a time that the automated assistant routine was initialized, or a status of the action of the set of actions.

5. The method of claim 1, wherein the additional content includes at least a portion of the data previously rendered at the first client device.

6. The method of claim 1, further comprising:
causing, in response to determining that the user has directly or indirectly indicated the interest in the automated assistant routine being continued at the second client device, the second client device to receive the additional content from a memory buffer of the first client device over a local area network.

7. A method implemented by one or more processors, the method comprising:
initializing an automated assistant to perform an automated assistant routine via a first client device, the automated assistant routine corresponding to a set of actions performed by the automated assistant;
generating routine instance data that provides information related to the automated assistant routine, the information identifying the first client device as an assigned device for the automated assistant routine;
causing the first client device to render content corresponding to an action of the set of actions in furtherance of the automated assistant routine;
determining that the user has become less proximate to the first client device, the determining based on sensor data from a sensor that is in communication with the first client device;
causing the rendering of the content at the first client device to be at least temporarily stopped in response to determining that the user has become less proximate to the first client device;
modifying the routine instance data to indicate that the automated assistant routine has been at least temporarily stopped at the first client device; and
when the user has become more proximate to a second client device that is accessible to the automated assistant:
causing the automated assistant to resume performing the automated assistant routine via the second client device according to the routine instance data, wherein the routine instance data includes additional action data that is based on an additional action of the set of automated assistant actions corresponding to the routine.

8. The method of claim 7, wherein modifying the routine instance data comprises modifying the routine instance data to indicate one or more actions of the set of actions have been completed or are in progress when the routine has been at least temporarily stopped.

9. The method of claim 7, further comprising:
when the user has become more proximate to the second client device:
accessing routine permissions associated with the automated assistant routine; and
determining based on the routine permissions, that the automated assistant routine is permitted to transfer to the second client device.

10. The method of claim 7, further comprising:
when the automated assistant routine has been resumed at the second client device:
causing modification of the routine instance data to indicate that the automated assistant routine has been resumed at the second client device.

11. The method of claim 10, wherein generating the routine instance data includes transmitting the information to a remote server device, and wherein modifying the routine instance data includes transmitting a request to the remote server device to modify the routine instance data.

12. The method of claim 7, wherein the sensor is integral to a third client device that is different than the first client device and the second client device.

13. The method of claim 7, wherein causing the automated assistant to resume performing the automated assistant routine via the second client device includes causing the second client device to render additional content corresponding to the action of the set of actions.

14. A system, comprising:
one or more network interfaces;
memory storing instructions; one or more processors, executing the instructions, to:
receive, via one or more of the network interfaces, data transmitted from a first client device;
determine that the data corresponds to a request for initialization of an automated assistant routine that corresponds to a set of automated assistant actions;
in response to determining that the data corresponds to the request:
generating content for an action of the set of automated assistant actions;
in response to the data that corresponds to the request for initialization of the automated assistant routine being received from the first client device:
transmitting, via one or more of the network interfaces, the content for the action to the first client device to cause the first client device to render the content for the action;
determine, during rendering of the content for the action by the first client device, that a user has directly or indirectly indicated an interest in the automated assistant routine being continued at a second client device; and
in response to determining that the user has indicated the interest in the automated assistant routine being continued at the second client device:
cause the second client device to render additional data that is in furtherance of the automated assistant routine, wherein the additional data includes additional action data that is based on an additional action of the set of automated assistant actions corresponding to the routine.

15. The system of claim 14, wherein in executing the instructions, one or more of the processors are further to:
in response to the data that corresponds to the request for initialization of the automated assistant routine being received from the first client device:
store routine instance data that identifies a status of the automated assistant routine as active at the first client device;
in response to determining the interest of the user in continuing the automated assistant routine at the second client device:
modify the routine instance data to indicate the automated assistant routine is inactive at the first client device or active at the second client device.

16. The system of claim 15, wherein in executing the instructions, one or more of the processors are further to:
determine that the routine instance data has been modified at the remote server device to indicate that the automated assistant routine is inactive at the first client device or active at the second client device; and
in response to determining that the routine instance data has been modified:
cause cessation of the rendering of the data at the first client device.

17. The system of claim 16, wherein in executing the instructions, one or more of the processors are further to:
generate the routine instance data, wherein the routine instance data further identifies two or more of a user or device that initialized the automated assistant routine, a time that the automated assistant routine was initialized, or a status of the action of the set of actions.

18. The system of claim 16, wherein the additional content includes at least a portion of the data previously rendered at the first client device.

19. The system of claim 14, wherein in executing the instructions, one or more of the processors are further to:
cause, in response to determining that the user has directly or indirectly indicated the interest in the automated assistant routine being continued at the second client device, the first client device to transmit, over a local area network, the additional content to the second client device, wherein the transmitted additional content is from a memory buffer of the first client device.

* * * * *